United States Patent

[11] 3,607,658

[72] Inventor Joseph L. Sardinas
 Gales Ferry, Conn.
[21] Appl. No. 805,019
[22] Filed Mar. 6, 1969
[45] Patented Sept. 21, 1971
[73] Assignee Pfizer Inc.
 New York, N.Y.

[54] β-METHYLCROTONIC ACID AND DERIVATIVES IN CARBOMYCIN A FERMENTATION
6 Claims, No Drawings

[52] U.S. Cl..................................................... 195/114, 195/80
[51] Int. Cl..................................................... C12d 9/00

[50] Field of Search........................................... 195/114, 117, 80

[56] References Cited
UNITED STATES PATENTS

| | | | |
|---|---|---|---|
| 2,796,379 | 6/1957 | Tanner et al.................. | 195/80 X |
| 2,918,413 | 12/1959 | Redemann.................... | 195/114 X |
| 3,483,088 | 12/1969 | Seeley........................... | 195/114 |

Primary Examiner—Joseph M. Golian
Attorney—Connolly & Hutz

ABSTRACT: Addition of β-methylcrotonic acid, or derivatives thereof, to carbomycin A-producing fermentation media gives rise to an increased yield of the antibiotic.

ABELLE# β-METHYLCROTONIC ACID AND DERIVATIVES IN CARBOMYCIN A FERMENTATION

BACKGROUND OF THE INVENTION

This invention relates to the production of the antibiotic called carbomycin A and, in particular, to the use of β-methylcrotonic acid, or corresponding derivatives, in its production by fermentation.

Carbomycin A is an antibiotic with important antibacterial properties and wide clinical application in the treatment of bacterial infections. The use of an antibiotic, particularly on a large scale, requires that it can be cheaply produced in large quantities.

In general terms, the media used in microbial fermentations include a source of nitrogen, a source of carbon and nutrient salts. Although less well understood, important additions include organic compounds that act as growth-promoting or potency-enhancing substances.

Organic compounds that enhance antibiotic fermentation yields may do so by direct incorporation into the antibiotic molecule or the metabolic degradative fragments may provide additional building blocks for the metabolic synthesis of the antibiotic. The "precursor" has been applied to such substances as phenylacetic acid and other monosubstituted acetic acid derivatives which, when added to the penicillin fermentation, are incorporated directly as the side-chain moiety into the penicillin molecule. It has been found, surprisingly, that β-methylcrotonic acid markedly enhances the yield of carbomycin A when added to the fermentation medium. The precise physiological role of β-methylcrotonic acid is not clear. Microbial cell production is not increased, nor is there evidence that it is incorporated directly into the carbomycin A molecule. A more likely explanation is that β-methylcrotonic acid is broken down during the fermentation process into smaller fragments which, during the reassembly process, play an important role in the biosynthesis of carbomycin A. Some supportive evidence for the indirect enhancing effect of β-methylcrotonic acid is provided by the observation that other organic compounds such as sorbic acid, α- and β-angelicalactone, isoprene, geraniol and crotyl alcohol also stimulate increased carbomycin A when added to the fermentation medium. However, the magnitude of this effect does not approach that provided by addition of 62-methylcrotonic acid.

SUMMARY OF THE INVENTION

In general, this invention embodies a process for increasing the carbomycin A fermentation yields by the addition of β-methylcrotonic acid, or derivatives thereof, to the fermentation media.

DETAILED DESCRIPTION OF THE INVENTION

A preferred process for the production of carbomycin A (U.S. Pat. No. 2,796,379 to F. W. Tanner, Jr., et al., June 18, 1957) involves the cultivation of Steptomyces halstedii ATCC-13449, preferably in an aqueous nutrient medium at a temperature of about 24–30° C., and under submerged conditions with agitation and aeration. Nutrient media which are useful for this process include a carbohydrate such as sugars, starch, glycerol and corn starch; a source of organic nitrogen such as that contained in casein, soybean meal, peanut meal, wheat gluten, cotton seed meal, lactalbumin, tryptone and enzymatic digest of casein. The use of enzymatic digest of casein as a nitrogen source is preferred. Additional growth substances are provided by the addition of such substances as distillers' solubles, yeast extract, molasses or fermentation residues, as well as mineral salts such as sodium chloride, potassium phosphate, sodium nitrate and magnesium sulfate. A soluble, nongrowth inhibiting, nonionic (poly) oxyethylene glycol ether surface-active agent, in an amount to provide a concentration of about 0.2–4 percent is included in the fermentation process. If excessive foaming is encountered during the fermentation, antifoaming agents, such as vegetable oils, may be added to the fermentation medium. The pH of the fermentation tends to remain rather constant, but, if variations are encountered, a buffering agent such as calcium carbonate may also be added to the medium.

It should be further observed that where alkali salts are specified, most salts will fulfill this definition at the levels and pH that are employed. Typical alkali salts which may be employed include the sodium, potassium, ammonium, lithium, calcium and barium salts. These compounds are generally best added at the time of medium makeup. However, a sterile solution or suspension of the compound may be added up to 24 hours after the addition of the inoculum.

An embodiment of this invention is the addition of β-methylcrotonic acid, alkali salts, or a derivative thereof, to the fermentation media at a concentration of about 0.5 to 5.0 millimoles, preferably 2.0 –2.5 millimoles, per liter. It is understood that β-methylcrotonic acid, or a source of β-methylcrotonic acid, comprises derivatives such as esters, amides, nitriles or other compounds which are readily converted to the respective acid or salts either by the fermentation micro-organism or by reaction with the fermentation media.

Inoculum for the preparation of antibiotic carbomycin A by the growth of a strain of S. halstedii may be obtained by employing growth from slants of such media as Emerson's agar or beef lactose. The growth may be used to inoculate either shaken flasks or inoculum tanks for submerged growth, or, alternatively, the inoculum tanks may be seeded from the shaken flasks. The growth of the micro-organism usually reaches its maximum in about 2 to 3 days. However, variations in the equipment used, the rate of aeration, rate of stirring, etc., may affect the speed with which the maximum activity is reached. In general, about 24 hours to 4 days is the desirable period for producing the antibiotic. Aeration of the medium in tanks for submerged growth is maintained at the rate of about one-half to two volumes of free air per volume of broth per minute. Agitation may be maintained by suitable types of agitators generally familiar to those in the fermentation industry. Aseptic conditions, of course, must be maintained throughout the preparation and transfer of the inoculum and the growth period of the micro-organism.

Recovery of the antibiotic is accomplished by means generally familiar to those skilled in the art, such as extraction, precipitation and the use of strong cation exchange resins.

The present invention embraces not only the use of the herein described organism but also of mutants thereof produced by subjecting the organism to such measures as X-radiation, ultraviolet radiation, nitrogen mustard and the like.

The following examples are merely illustrative and are not intended to limit the invention, the scope of which is defined by the appended claims.

EXAMPLE I

An inoculum is prepared, using a growth medium having the following composition:

|  | Grams/liter |
| --- | --- |
| Cerelose | 15.0 |
| Soy flour | 30.0 |
| $MgSO_4 \cdot 7H_2O$ | 1.0 |
| Calcium carbonate | 10.0 |

The medium is adjusted to pH 6.8 with potassium hydroxide, and then sterilized and cooled. Spores of a 7-day old Emerson agar slant of S. halstedii ATCC-13449 are transferred under aseptic conditions into 20 ml. of water, and a homogeneous suspension of spores is obtained by shaking. Six ml. of this suspension is transferred into 750 ml. of the above medium in a 2.8 liter Fernbach flask, and shaken for 48 hours at 30° C.

A nutrient medium is prepared having the following composition:

| | | Grams/liter |
|---|---|---|
| Enzose E-081 (sugar concentrated, Corn Products, Inc.) | 25.0 ml. | |
| Beet molasses | | 22.5 |
| Wheat Starch | | 5.0 |
| Cerelose | | 15.0 |
| Casein Digest (5 percent) | | 400 ml. |
| $MnSO_4 \cdot H_2O$ | | 1.5 |
| $MgSO_4 \cdot 7H_2O$ | 1.25 | |
| $CuSO_4 \cdot 5H_2O$ | 0.20 | |
| β-methylcrotonic acid | | 0.20 (2.0 mM) |

The pH of the medium is adjusted to 7.0 with potassium hydroxide. One-half ml. Antifoam A (Dow Chemical Company) and 20 ml. Tergitol NP-35 (Union Carbide) are added per liter of medium, and the mixture is sterilized.

A 10 percent aliquot of the inoculum is transfered under aseptic conditions into the above nutrient medium. After agitation and aeration for two days, the potency of the broth is found to be about 2635 micrograms of carbomycin A per ml. The potency of the control medium (without β-methylcrotonic acid) averages about 2,075 m.c.g./ml.

EXAMPLE II

The process of example I is repeated with 0.25 grams (2.5 mM) of β-methylcrotonic acid per liter in place of 0.20 grams per liter, with comparable results.

EXAMPLE III

The process of example I is repeated with the β-methylcrotonic acid replaced by 0.23 grams (2.0 mM) per liter of the methyl ester of β-methylcrotonic acid, with comparable results.

EXAMPLE IV

The process of example 1 is repeated with the β-methylcrotonic acid replaced by 0.32 grams (2.5 mM) per liter of the ethyl ester of β-methylcrotonic acid, with comparable results.

EXAMPLE V

The process of example I is repeated with the β-methylcrotonic acid replaced, at a level of 2.0 mM per liter, of the potassium, sodium, and calcium salts of β-methylcrotonic acid, with comparable results.

EXAMPLE VI

The inoculum of example I is used to inoculate a nutrient medium having the following composition:

| | Grams/liter |
|---|---|
| Cerelose | 25.0 |
| Beet Molasses | 15.0 |
| Wheat starch | 5.0 |
| Casein digest (5 percent) | 400 ml. |
| $MnSO_4 \cdot H_2O$ | 1.5 |
| $MgSO_4 \cdot 7H_2O$ | 1.25 |
| $CuSO_4 \cdot 5H_2O$ | 0.20 |
| β-methylcrotonic acid | 0.20 (2.0 mM) |

The pH of the medium is adjusted to 7.0 with potassium hydroxide. One-half ml. Antifoam A (Dow Chemical Company) and 20 ml. Tergitol NP-35 (Union Carbide) are added per liter of medium, and the mixture is sterilized.

A 10 percent aliquot of the inoculum of example I is transferred under aseptic conditions into the above nutrient medium. After agitation and aeration for two days, the broth potency is comparable to that of example I.

EXAMPLE VII

The process of example VI is repeated with 0.25 grams (2.5 mM) per liter of β-methylcrotonic acid in place of 0.20 grams per liter, with comparable results.

EXAMPLE VIII

The process of example VI is repeated with 0.05 grams (0.5 mM) per liter of β-methylcrotonic acid in place of 0.20 grams per liter, with comparable results.

EXAMPLE IX

The process of example VI is repeated with 0.5 grams (5.0 mM) per liter of β-methylcrotonic acid in place of 0.20 grams per liter, with comparable results.

EXAMPLE X

The process of example VI is repeated with 0.20 grams (2.0 mM) per liter of the amide of β-methylcrotonic acid in place of β-methylcrotonic acid, with comparable results.

I claim:

1. In the process for the production of carbomycin A by fermentation of *Streptomyces halstedii* the improvement which comprises conducting the fermentation in the presence of β-methylcrotonic acid, its alkali salts, or a derivative thereof which is readily converted to the said acid or salts either by the fermentation micro-organism or by reaction wit the fermentation media in an amount to provide a concentration of about 0.50 –5.0 millimoles per liter.

2. The process of claim 1 wherein said derivative is the methyl ester of β-methylcrotonic acid.

3. The process of claim 1 wherein said derivative is the ethyl ester of β-methylcrotonic acid.

4. The process of claim 1 wherein said salt is the sodium, potassium, or calcium salt of β-methylcrotonic acid.

5. The process of claim 1 wherein said derivative is the amide of β-methylcrotonic acid.

6. In the process for the production of carbomycin A by the cultivation of *Streptomyces halstedii* ATCC-13449 in an aqueous, nutrient medium under submerged, aerobic conditions, the improvement which comprises the addition to said medium of β-methylcrotonic. acid in an amount to provide a concentration of about 2.0 –2.5 millimoles per liter.